United States Patent [19]
Olenick

[11] Patent Number: 4,551,061
[45] Date of Patent: Nov. 5, 1985

[54] FLEXIBLE, EXTENSIBLE ROBOT ARM

[76] Inventor: Ralph W. Olenick, 7948 McClellan Rd. #4, Cupertino, Calif. 95014

[21] Appl. No.: 485,654

[22] Filed: Apr. 18, 1983

[51] Int. Cl.$^4$ ............................................. B66C 1/10
[52] U.S. Cl. ..................................... 414/735; 73/731; 901/21; 901/9
[58] Field of Search .......................... 414/7, 735, 730; 901/21, 9; 73/731

[56] References Cited

U.S. PATENT DOCUMENTS

| | | | |
|---|---|---|---|
| 1,590,919 | 6/1926 | Wahl et al. | 73/731 |
| 3,284,964 | 11/1966 | Saito | 414/7 X |
| 4,218,166 | 8/1980 | Abu-Keel et al. | 901/21 X |

FOREIGN PATENT DOCUMENTS 17016 10/1980 European Pat. Off. ............. 901/21

Primary Examiner—Robert J. Spar
Assistant Examiner—Donald W. Underwood
Attorney, Agent, or Firm—Thomas Schneck

[57] ABSTRACT

A robot arm formed of a bundle of adjacent elastomeric tubes supplied independently with fluid pressure to force bending, extension or contraction. The tubes are maintained in parallel alignment by means of spaced apart parallel ribs through which the tubes pass. Parallel, spaced apart, rods extending through the ribs, but fixed at one end, have opposite free ends passing into position sensors. Bending and lengthwise changes in arm position may be sensed by the rods and used to control pressure in individual arms to correct or change arm position.

2 Claims, 7 Drawing Figures

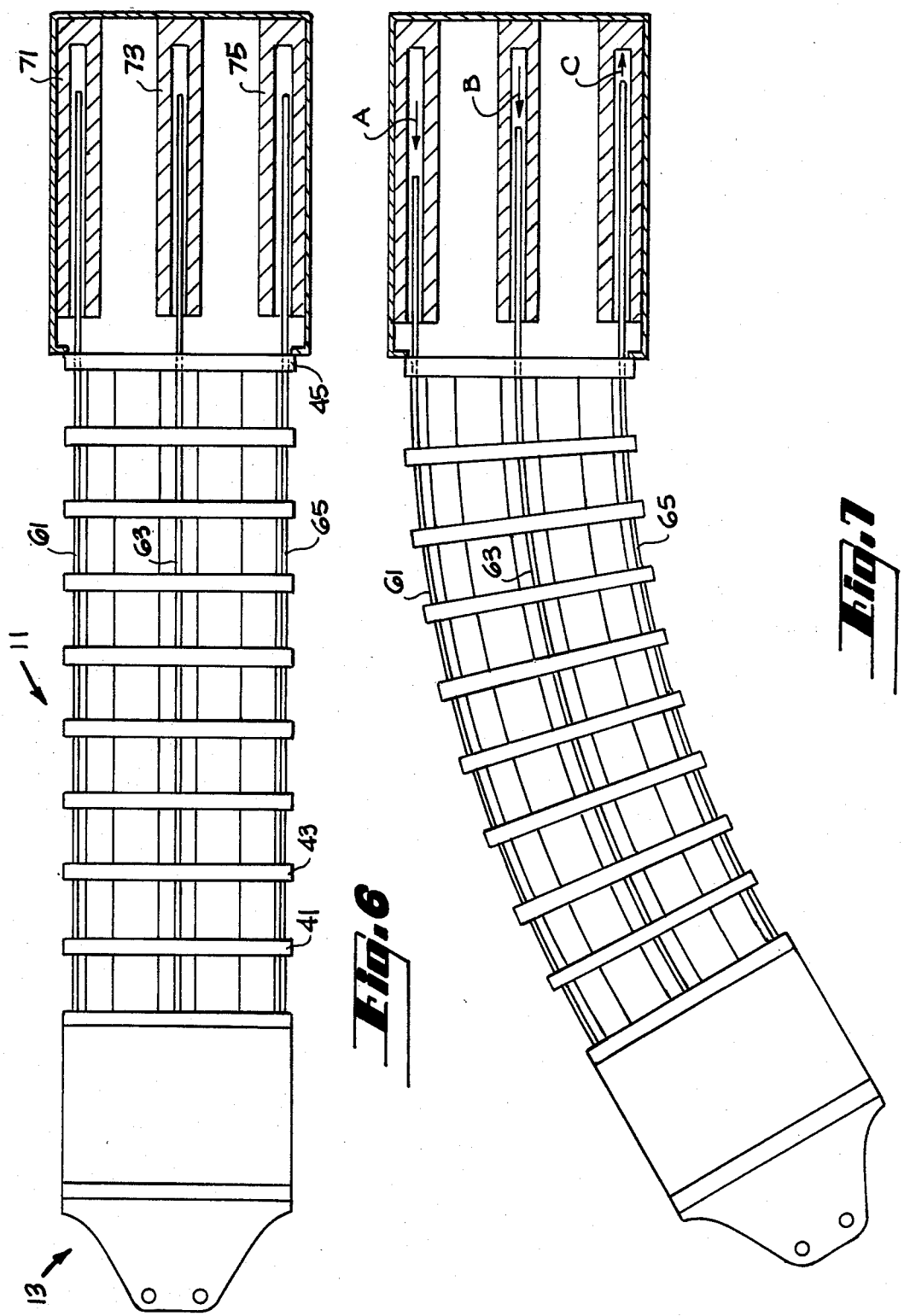

though the use of fluid power for extension and flexure of the arm would not be impaired. While elastomeric tubes have been described, a thin walled metallic tube, such as copper, could be used to provide the desired extension and flexure, if sufficiently thin to prevent radial expansion.

FLEXIBLE, EXTENSIBLE ROBOT ARM

TECHNICAL FIELD

The invention relates to robot arms, and more particularly to a flexible and extensible arm.

BACKGROUND ART

Most robot arms of the prior art are rigid. Rigidity is desired for lifting loads having substantial mass and, it has been tought, for accurate positioning of the arm. Most prior art robot arms rely on motors for accurate movement of arm joints. Usually robot arms are formed by a plurality of rigid links connected by joints with motors changing positions of the links, usually by means of gears attached to the links at the joints. Alternatively, exterior hydraulic pistons and cylinders have been used to change the position of one link relative to another link in much the same way as linkages appearing on other industrial equipment, such as earth moving equipment and farm machinery. The most recent robot arms developed utilize servo controlled stepper motors for precise positioning of arm links.

There is a class of robot applications where a rigid arm is not desired. For example, in home uses a rigid arm could be dangerous, especially where small children are present. In other applications, where the object to be manipulated has very low mass, such as a wafer of the type used in integrated circuit fabrication, a rigid arm is simply not needed and could cause damage to a wafer in the event of a positioning error. Since a rigid arm is not intended to give, a positioning error could cause breakage of the wafer by causing it to bump into a fixed object. There is still another class of robots, which may be classified as toys or theatrical robots, which perform under computer control. These robots do not need rigid arms and might be dangerous if so equipped.

Another object of the invention was to devise a non-rigid or semi-rigid robot arm which could bend or extend on command.

DISCLOSURE OF INVENTION

The above object has been achieved in a robot arm formed of a plurality of parallel, elongated adjacent elastomeric tubes which form a tube bundle. One end of the tube bundle is adapted for connection to a gripper while the opposite end has an interface for control circuitry. The elastomeric tubes are supplied with differential fluid pressure, pneumatic or hydraulic, to force bending. The tubes are maintained in parallel alignment by means of spaced apart parallel ribs, formed by disks, through which the tubes pass. The ribs form a framework for supporting the tubes, as well for supporting an outer covering for the arm. When differential fluid pressure is applied to the tubes, the arm flexes. If pressure is uniformly increased, the arm extends.

The elastomeric tubes may be constrained against radial expansion by means of helical springs disposed about the tubes. The springs prevent outward bulging of the tubes.

A plurality of flexible rods extend through guide holes in the periphery of the ribs and are fixed at the gripper end of the tube bundle. At the opposite end of the tube bundle, the rods may be inserted into linear electronic position sensors such as an optical position encoder so that the rods, upon flexing of the arms, may be sensed and control circuitry may be provided to adjust differential pressure in the arm. Servo control may be provided using the transducers to generate a position signal which is combined with a command signal. The difference between the command and the position signals is an error signal which may be corrected by applying the proper amount of differential pressure.

BRIEF DESCRIPTION OF DRAWINGS

FIG. 6 is a top plan view of a robot arm of the present invention in a straight position.

FIG. 7 is a top plan view of the present invention in a flexed condition.

BEST MODE FOR CARRYING OUT THE INVENTION

Figure 1:
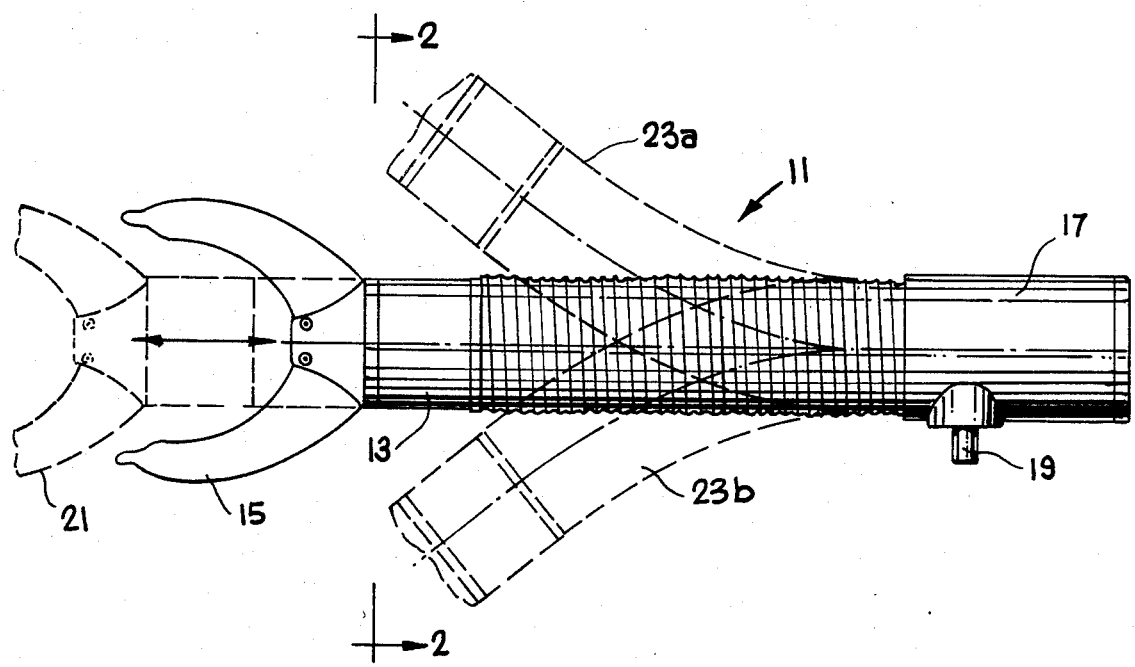
FIG. 1 is a top plan view of the robot arm of the present invention with a gripper connected thereto.

With reference to FIG. 1, the robot arm 11 is shown, having a first end 13 connected to a gripper 15 and a second end 17 connected to a fluid pressure supply line 19. The arm is extendible as indicated by dashed lines 21 upon application of a uniform amount of fluid pressure in each of the cylinders or can flex as indicated by the dashed lines 23a and 23b upon application of differential amounts of pressure.

Figure 2:
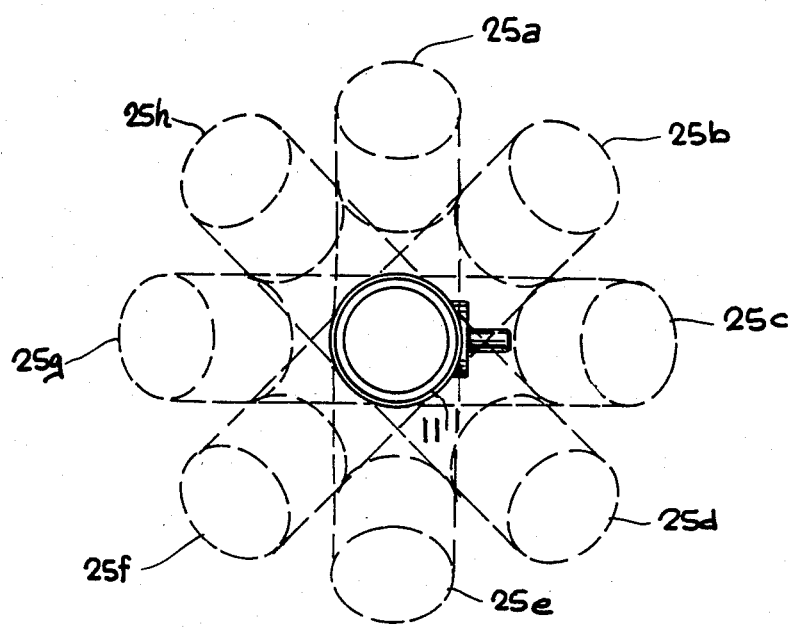
FIG. 2 is a sectional view taken along lines 2—2 of FIG. 1 showing degrees of freedom of the robot arm.

With reference to FIG. 2, the range of motion of the arm 11 is not limited to a single plane. Rather, the range is entirely variable, with possible positions indicated by the dashed lines 25a . . . 25h. The two flexed positions illustrated in FIG. 1 can be achieved by providing two parallel, elongated elastomeric tubes in a tube bundle, with the two tubes maintained in parallel alignment. Then by supplying differential pressure to the two tubes, resembling thick-walled balloons, the motions shown in FIG. 1 may be achieved. If more than two tubes are provided, then a full range of motions, as illustrated in FIG. 1, may be achieved.

Figure 3:
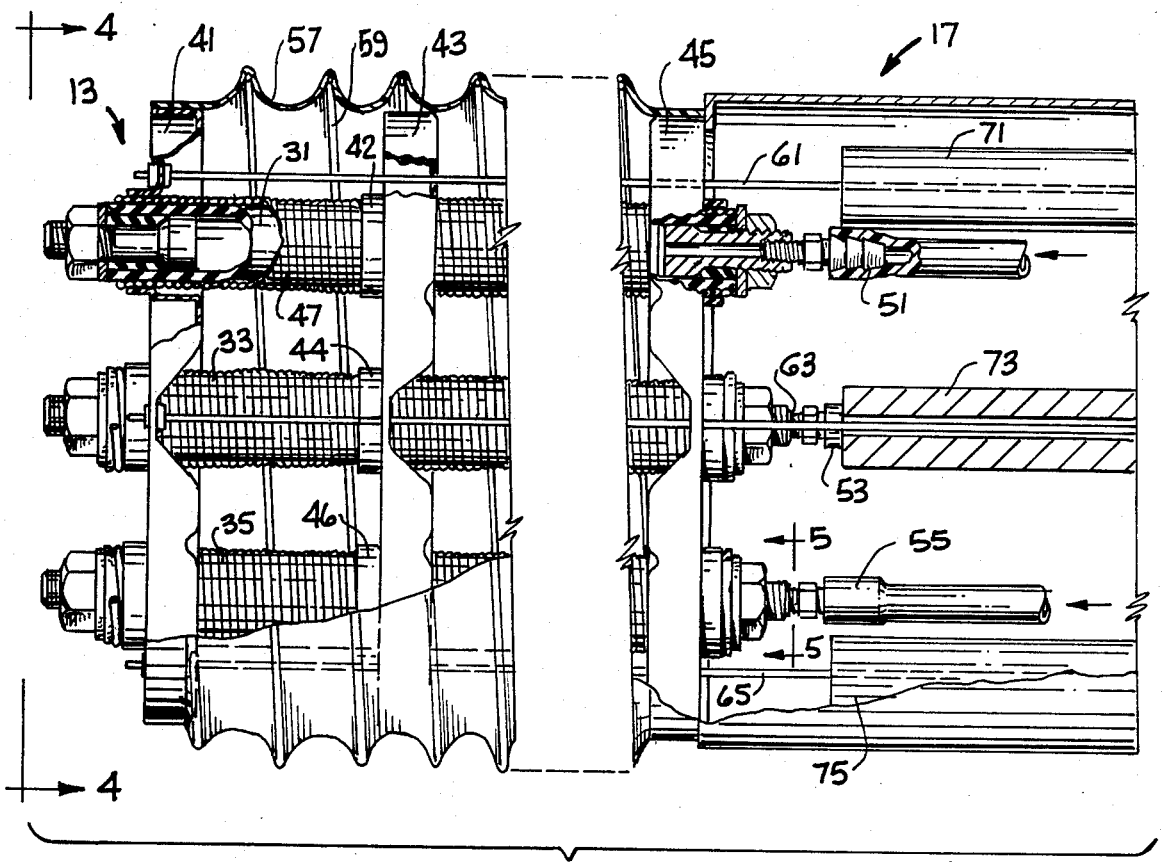
FIG. 3 is a top, partially cut-away view of the robot arm of the present invention.

FIG. 3 shows a configuration having three parallel elastomeric tubes 31, 33 and 35. These tubes extend through a series of parallel ribs 41, 43, and 45. The tubes are approximately 1.5 centimeters in diameter and are fastened at a first end of the arm 13 in a manner described below. The opposite end of the tubes are secured at end 17 in a similar manner. The tubes have helical springs 47 surrounding their outer surface to prevent radial expansion of the elastomeric tubes. Only lengthwise expansion is desired. The tube material may be sufficiently tough to resist radial expansion or springs may be provided as shown. In order to prevent radial expansion, the tubes may have helically wound fibers of polyester or similar material incorporated in the elastomeric material. This would eliminate the need for exterior springs.

The ribs 41, 43, and 45 have apertures, such as apertures 42, 44 and 46 defined therein. Since each of the ribs 41, 43 and 45 has apertures in corresponding locations, such apertures form a passageway for seating the elastomeric tubes. The passageways are generally parallel such that the tubes may be maintained in generally parallel alignment. Pressure lines 51, 53 and 55 are connected to each of the tubes for introducing the proper amount of fluid pressure. A fluid supply source, not shown, independently supplies each of the lines 51, 53 and 55 under machine control.

In order to ascertain the amount of flexing of the robot arm, a plurality of flexible rods 61, 63 and 65 is disposed about different radial positions of the arm. The rods are fixed at end 13 by means of connection to rib 41. At an opposite end, the rods pass through a linear position sensor 71, 73, and 75. The rods are movable within the sensor with the amount of motion therein being converted into a digital electrical signal. The electrical signal may then be used to gauge the amount of arm flexing or extension. Preferably, the flexible rods are placed at equi-angular peripheral regions of the arm.

A fabric covering 57, resembling a sleeve, is disposed about the ribs 41, 43 and 45 about their circumferential periphery. The sleeve is to protect internal components from dirt and to give the arm a decorative outward appearance. The fabric sleeve may be supported directly on the ribs or may have its own framework consisting of a radial spring 59 slightly exceeding the circumference of the ribs. By providing a separate support structure, the sleeve may have radial dimples which tend to become taut on flexing.

Figure 4:
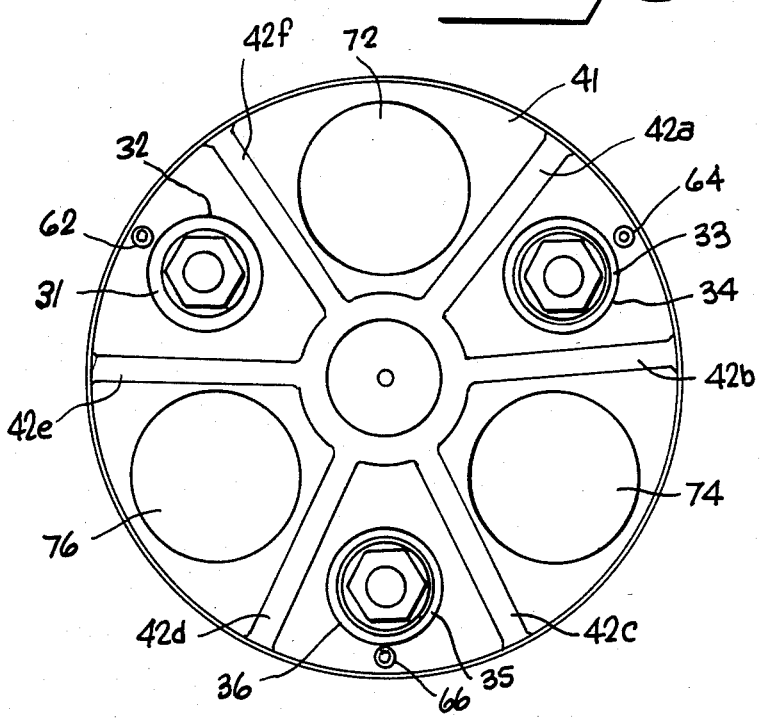
FIG. 4 is an end view taken along lines 4—4 of FIG. 3.

With reference to FIG. 4, the rib 41 is shown terminating tubes 31, 33 and 35. The rib 41 is seen to be a round disk with radial structural reinforcement bosses 42a, 42b . . . 42f. Between these bosses are apertures, including apertures 32, 34 and 36, which partially define passageways for the tubes 31, 33 and 35 respectively. Additionally, apertures 62, 64 and 66 are provided to seat the flexible rods. In rib 41, the flexible rods are held in place with a fastener. In other ribs, the rod may pass therethrough being guided by a linear bearing in that place. Rib 41 also includes apertures 72, 74 and 76 which may allow passage or other control lines therethrough, such as fluid control lines for the robot gripper. Additionally, these apertures serve the function of lightening the weight of the ribs.

Figure 5:
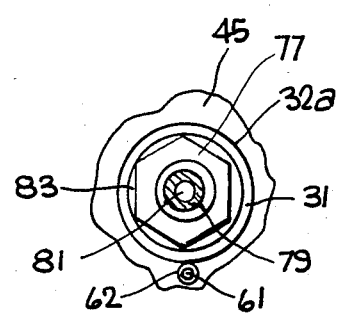
FIG. 5 is a detail of a tube terminating assembly illustrated in FIG. 4.

FIG. 5 illustrates the termination of a tube in a rib 45 at the second end of the robot arm. The tube has an aperture 32a seating tube 31 and its encircling helical spring. From the back side of rib 45, not shown, a bolt is seated in the tube which is locked in place by means of a nut 77. The shank 79 of the bolt has a central hole 81 drilled therein for allowing fluid pressure to be connected into the interior of the tube. A washer 83 seals the end of the tube and rests against the spring. Washer 83 is pushed inwardly by tightening nut 77 and forms an expansion fluid seal against both the elastomeric tube material and the spring.

Hole 81 may be threaded to seat a hollow threaded adaptor which fits into these threads on one end and on another end connects to a fluid supply line.

The flexible rod 61 is shown extending through rib 45 through aperture 62. The operation of the rod is explained below.

With reference to FIGS. 6 and 7, a robot arm 11 is shown having an interface 13 for mounting a gripper or other tool. At an end of the arm opposite the interface, transducers 71, 73 and 75 are connected. Flexible rods 61, 63 and 65, supported by parallel ribs 41, 43 . . . 45. The parallel rods also add rigidity to the flexible arm. In FIG. 6 the rods are shown to extend the same amount into respective transducers. As the amount of fluid is varied into the tubes, flexing of the arm occurs as illustrated in FIG. 7. This causes a change in position of the rods with rod 61 moving in the direction indicated by the arrow A, rod 63 moving in the direction indicated by arrow B, and rod 65 moving in the direction indicated by arrow C. Since the position of the transducers is known, and since motion of the rods within the transducer is converted to an electrical signal proportional to the amount of rod motion, the extent of flexing of the arm may be computed. Transducers that convert the position of the rods to a proportional electrical signal are well known. For example, a linear variable differential transformer (LVDT) could be used. See Handbook of Measurement and Control, rev. ed., Pennsauken, N.J.: Schaevitz Engineering (1976).

The motion reported by transducers 71, 73 and 75 represents the actual arm position. Usually, an arm is directed to a particular target by means of a command signal. Any difference between the command signal and the reported actual position represents an error signal. The error may be reduced to zero by means of a conventional closed loop servo system which is connected to the fluid control supply. Whenever an error is reported, fluid is injected or removed from appropriate tubes in order to correct arm position for zero positional error. Instead of a closed loop servo system, as described, an open loop system may also be used where the arm is merely directed to a desired position by providing needed amounts of fluid to the various tubes.

I claim:

1. A flexible robot arm comprising,
   a tubular sleeve having an elongated dimension,
   a plurality of spaced, generally parallel ribs within said sleeve providing support therefor transverse to said elongated dimension, said ribs having at least two apertures defined in each rib, said apertures being linearly aligned from rib to rib, forming passageways through the sleeve,
   an elastomeric tube extending the length of the sleeve seated in each passageway, said tube having a fluid inflow and outflow port,
   fluid supply means for supplying varying amounts of fluid to each tube, and
   a plurality of flexible rods are disposed through said ribs, parallel to said tubes, said flexible rods being anchored at one end and connected to a transducer at another end, said transducer adapted to convert rod displacement due to flexing or extension into an electrical signal corresponding to said displacement.

2. A flexible robot arm comprising,
   a plurality of spaced, generally parallel round disks having three apertures defined in each disk, said apertures being linearly aligned from disk to disk, forming passageways,
   an elastomeric tube extending the length of the robot arm seated in each passageway, said tube having a fluid inflow and outflow port,
   fluid supply means for supplying varying amounts of fluid to each tube, said fluid supply means connected to first ends of said tubes and a gripper interface connected to a second end of said tubes,
   helical springs disposed about said tubes for constraining the radial expansion,
   a tubular sleeve enclosing said disks, the plane of said disks being transverse to the axis of the sleeve,
   three flexible rods disposed through said disks, parallel to said tubes, said flexible rods being anchored at one end and connected to a transducer at another end, said transducer adapted to convert rod displacement due to flexing or extension into an electrical signal corresponding to said displacement, and fluid lines extending through said disks for supplying fluid to a gripper, said gripper being fluid operated.

* * * * *

UNITED STATES PATENT AND TRADEMARK OFFICE
CERTIFICATE OF CORRECTION

PATENT NO. : 4,551,061

DATED : November 5, 1985

INVENTOR(S) : Ralph W. Olenick

It is certified that error appears in the above—identified patent and that said Letters Patent is hereby corrected as shown below:

Col. 2, line 47 "illustrated in FIG. 1" should read --illustrated in FIG. 2--.

Col. 4, line 29 "needed amounts of fluid to the various tubes." should be followed by
--While the preferred embodiment described herein uses three tubes for arm motion, two tubes could be used, as previously mentioned, or more than three tubes could be used.

Position corrections may be needed when an object having any substantial mass is picked up. A unique aspect of this design is that small deformations in the structural stress is sensed by the rods and can be compensated for by adding or subtracting appropriate fluid pressures. This will change the arm position relative to a command, since the command is introduced for an arm not under load. Since the load may have a variable weight, correction of arm position will be needed. The arm of the present invention is not designed to carry any substantial load. However, low mass objects, such as wafers, or integrated circuits may be picked up.

While Fig. 7 shows bending of the arm, it will be recognized that the arm may be linearly extended, as illustrated in Fig. 1, by injecting relatively equal amounts

UNITED STATES PATENT AND TRADEMARK OFFICE
CERTIFICATE OF CORRECTION

PATENT NO. : 4,551,061

DATED : November 5, 1985

INVENTOR(S) : Ralph W. Olenick

It is certified that error appears in the above—identified patent and that said Letters Patent is hereby corrected as shown below:

of fluid pressure to each of the elastomeric tubes.  This should cause lengthwise extension of the arm without bending.--

Signed and Sealed this

Twenty-second Day of April 1986

[SEAL]

Attest:

DONALD J. QUIGG

Attesting Officer

Commissioner of Patents and Trademarks